Dec. 25, 1928.
J. B. DES ROSIERS
1,696,839
CONTROLLING MECHANISM FOR WHEEL BRAKES
Original Filed June 24, 1925     5 Sheets-Sheet 3
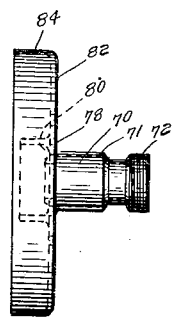
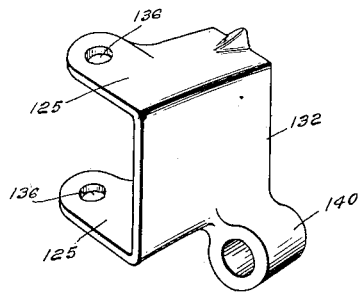
*Fig.10*
*Fig.11*
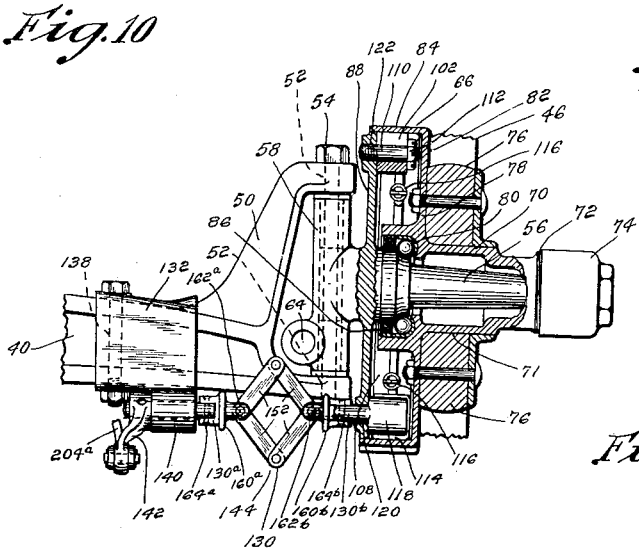
*Fig.12*
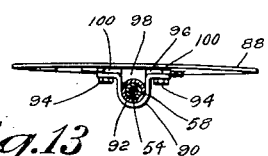
*Fig.13*
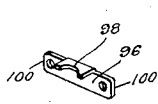
*Fig.16*
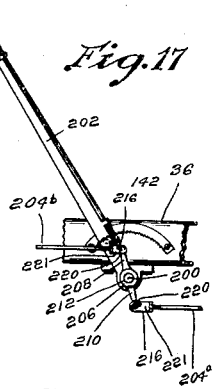
*Fig.17*
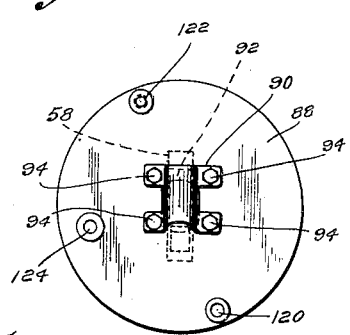
*Fig.14*
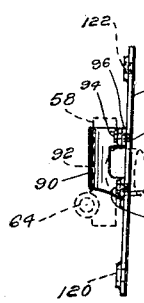
*Fig.15*
INVENTOR.
John B. DesRosiers
BY Thomas A. Jenckes Jr.
ATTORNEY.

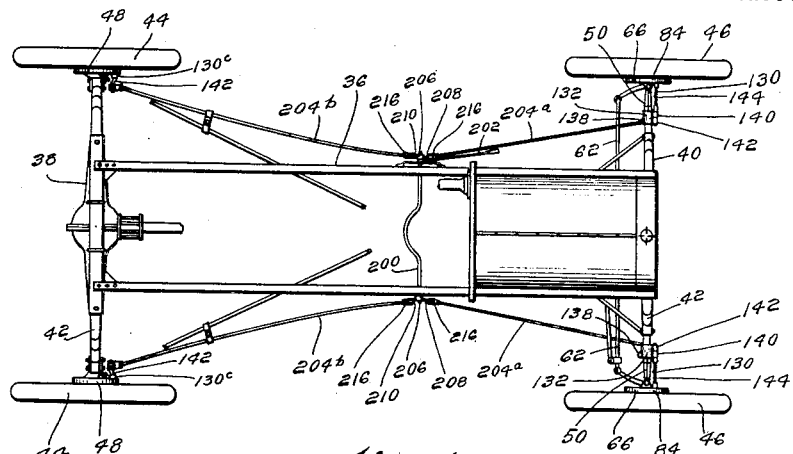

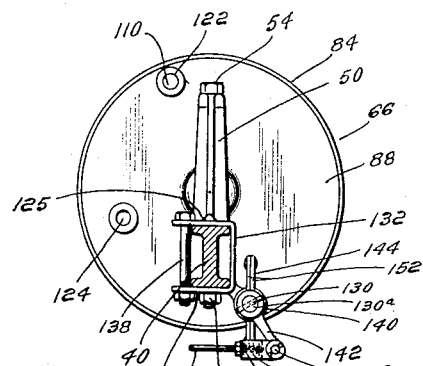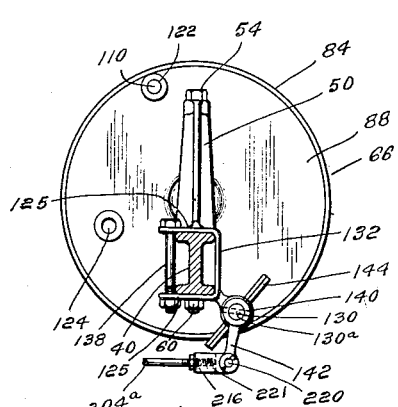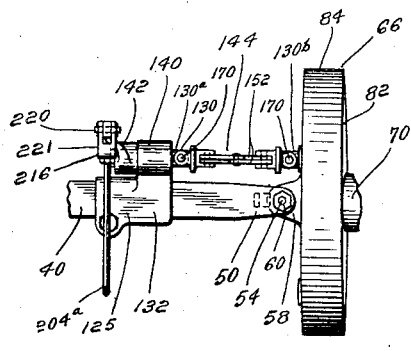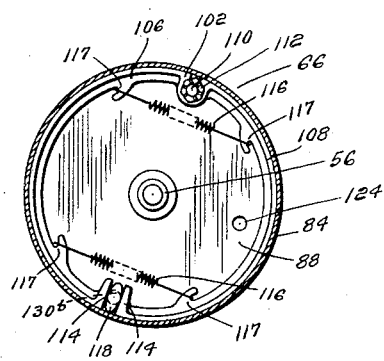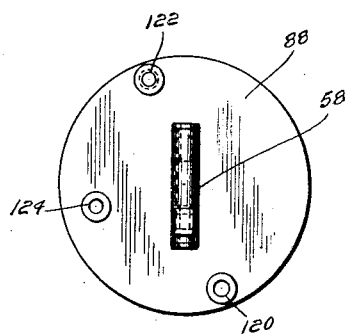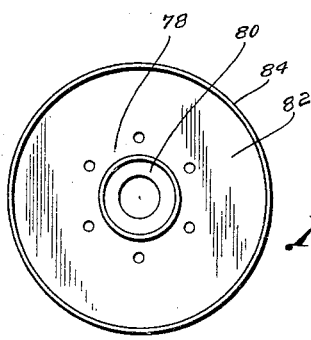

Dec. 25, 1928.

J. B. DES ROSIERS 1,696,839

CONTROLLING MECHANISM FOR WHEEL BRAKES

Original Filed June 24, 1925  5 Sheets-Sheet 4

INVENTOR.
John B. Des Rosiers
BY Thomas A. Jewelers Jr.
ATTORNEY.

Dec. 25, 1928.  1,696,839

J. B. DES ROSIERS

CONTROLLING MECHANISM FOR WHEEL BRAKES

Original Filed June 24, 1925   5 Sheets-Sheet 5

INVENTOR.
John B. DesRosiers
BY Thomas A. Jucker Jr.
ATTORNEY.

Patented Dec. 25, 1928.

1,696,839

UNITED STATES PATENT OFFICE.

JOHN B. DES ROSIERS, OF PROVIDENCE, RHODE ISLAND.

CONTROLLING MECHANISM FOR WHEEL BRAKES.

Application filed June 24, 1925, Serial No. 39,296. Renewed April 20, 1928.

My invention relates to controlling means for vehicle front wheel brakes.

Vehicle wheel brakes no matter whether they be of the expansion or contraction type require some means to apply either by contraction or expansion the brake band to the brake drum. This becomes a rather difficult problem for front wheels which have to rotate freely around a substantially horizontal axis and swivel around a substantially vertical axis. Rotatable means attached to the vehicle preferably substantially parallel to the front axle which in motor vehicles is usually stationary is normally provided to move the brake band to contact the brake drum. These rotatable rods in front wheel brakes of the mechanical type are usually attached to either the axle or the frame in a vertical plane with the axis of the axle and are usually provided with some type of universal joint, the swiveling point thereof usually being on a line with the swiveling point of the vertical spindle so that as the front wheels swivel, the portion of the rotatable means nearest the brake will theoretically swivel about the vertical spindle without changing its radius. As the spindle yoke and vertical spindle are normally of a height corresponding to the desirable diameter of a brake drum, it has been almost impossible to attach this type of controlling mechanism in this fashion without thoroughly re-designing the whole axle or wheel. Even theoretically correct controlling means such as hitherto described have not functioned perfectly due to the relative play between the axle or frame and wheel, the fact that the parts wear so as not to revolve on a theoretically unchanging radius and the friction present in former joints of this type. The chief object of my invention is to provide an improved mechanical controlling means for applying front wheel brakes.

I have found that the reason why former brakes have not functioned successfully is that no one has hitherto designed a satisfactory joint sufficiently freely expansible and flexible in all directions. I am aware that expansible joints comprising sliding bearings have been designed for this purpose but so far as I am aware none of these have gone into practical use due to the friction between the parts of the bearing. A further object of my invention therefore is to provide a freely expansible joint for the rotatable means used for this purpose which may freely expand or contract with a minimum amount of friction to permit swiveling of the front wheels.

A further object of my invention, therefore, is to provide controlling means for front wheel brakes which may be freely rotated to apply the brakes and at the same time due to the practical absence of friction will permit the front wheels to be readily turned as usual.

A rather remarkable incident of my invention is that when a modification thereof is employed having means to universally mount the expansible members thereof on the rotatable means that the joint becomes so flexible that when the front wheel brakes are applied and the wheels are swivelled the controlling mechanism will immediately release the front wheel brakes. As this result is not so desirable I prefer to so mount the expansible members on the rotatable means as to permit their pivoting thereon in one plane only, as shown in my preferred embodiment. A further object of my invention is to provide such a freely expansible and flexible rotatable controlling means that each front brake is applied with equal force, not matter what the angle of swiveling thereof may be. This latter advantage has been the chief argument for the use of fluid pressure actuated front wheel brakes.

A further object of my invention is to provide a rotatable controlling means for front wheel brakes which as it has two points of swiveling approximately in the same plane and is freely expansible axially may function no matter at what point it is attached to the brake disk. I thus provide a construction which may be readily attached to existing automobiles without re-designing the front wheel axles thereof and a construction which will function more perfectly than any hitherto constructed even if attached axially in line vertically with the axle.

A further object of my invention is to provide in sub-combination a rotatable means which is freely expansible and freely flexible in all directions no matter where or how employed.

A further object of my invention is to provide an additional combination with the braking mechanisms for rear wheels of a vehicle of means whereby the pressure may be applied on both front and rear wheels by a pulling motion, which means may also be provided with turnbuckles or other adjustable means to apply the rear wheel brakes first before the application of the front wheel brakes as is normally desirable and also to compensate for varying amounts of wear on the individual brakes.

These and such other objects of my invention as may hereinafter appear will be best understood from a description of the embodiments thereof shown in the accompanying drawings applied to a model T Ford automobile.

In the drawings, Fig. 1 is a plan view of the chassis of an automobile equipped with my invention.

Fig. 2 is a front elevation of the front axle of the automobile having the front wheels swiveled thereon and with my invention attached thereto, the wheels being swiveled to move directly forward.

Fig. 3 is a front elevation similar to Fig. 2 with the wheels swiveled to the right to turn the car to the right.

Fig. 4 is a sectional view taken along the line 4—4 of Fig. 2.

Fig. 5 is a sectional view similar to Fig. 4, the front wheel brake controlling means being rotated to apply the brakes.

Fig. 6 is a reverse plan view of the right front wheel brake drum pivoted on its respective end of the axle shaft and having my invention attached.

Fig. 7 is a sectional view through the brake mechanism taken along the line 7—7 of Fig. 2.

Fig. 8 is a detailed view looking towards the inner end of a front brake flange.

Fig. 9 is a detailed side elevation of the brake drum, the braking mechanism having been removed.

Fig. 10 is a front elevation of an attached brake drum and integral hub casing.

Fig. 11 is a perspective view of the bracket I employ to mount my rotatable controlling means on the front axle.

Fig. 12 is an enlarged front elevation partially shown in section of the right wheel hub, brake mechanism and adjacent end of the axle having my invention attached.

Figs. 13–16 show a modified form of means to detachably secure the necessary brake flange on the present type of vertical spindle, Fig. 13 being a plan view of said flange, the vertical spindle casing being shown in section, Fig. 14 being a side elevation thereof, Fig. 15 being a front elevation thereof, and Fig. 16 being a perspective view of the piece I attach to the inner face of the brake flange to insure that the flange will keep a similar amount off a vertical axis with the wheel to provide for the wear on the tire as is usual in the present day construction.

Fig. 17 is a side elevation of the emergency brake lever and controller shaft showing the levers of the first class I attach thereto and the means I employ for pivotally and adjustably attaching the longitudinally extending rotatable rod actuating oscillatable rods thereto.

Figs. 18–30 show views of various modifications of the improved means I employ for connecting the rod sections of the rotatable means together to permit free expansion and flexibility thereof.

Figure 18:
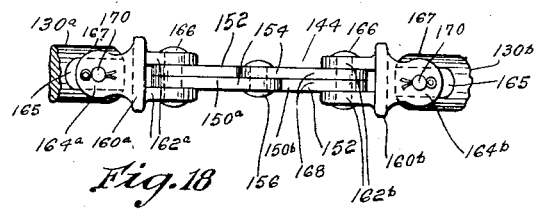
Figure 19:
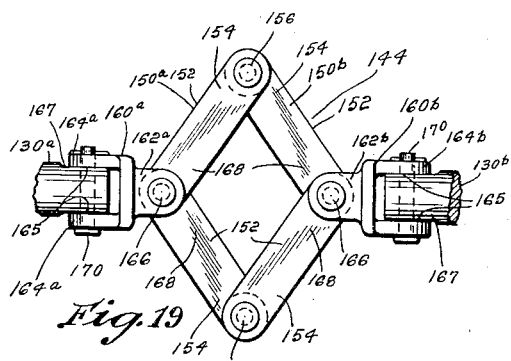

Figs. 18 and 19 show the preferred embodiment of this connecting means, the toggle joints being pivoted in the same plane on ends of the rod sections, Fig. 18 being a plan view thereof when moved to vertical position and Fig. 19 being a side elevation thereof.

Figure 20:
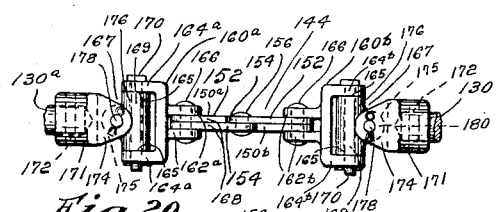
Figure 21:
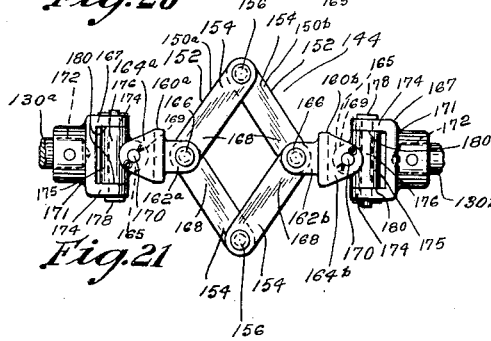

Figs. 20 and 21 show a modified form of this connecting means wherein the toggle joints are universally pivoted on adjacent ends of the rod sections, Fig. 20 being a plan view thereof when moved to vertical position and Fig. 21 a side elevation thereof.

Figure 22:
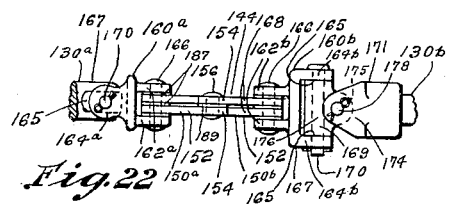
Figure 23:
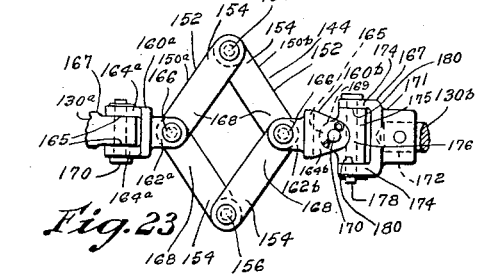

Figs. 22 and 23 show a further modification thereof wherein one end of the connected toggle joints is pivoted in one plane on the end of one rod section and the other end of the connected toggle joints is universally pivoted on the adjacent end of the other rod section, Fig. 22 being a plan view when moved to vertical position, and Fig. 23 being a side elevation thereof.

Figure 24:
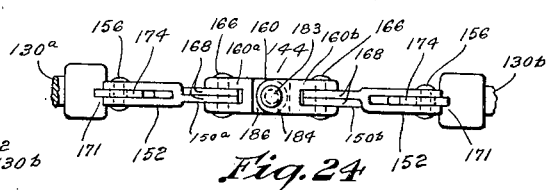
Figure 25:
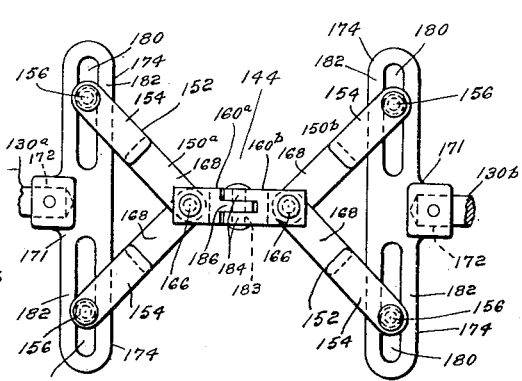

Figs. 24 and 25 show a further modified form of my invention, wherein the toggle joints are separated and are slidably mounted on brackets attached to adjacent ends of the rod sections, the joints being centrally connected together to pivot in one plane, Fig. 24 being a plan view thereof when moved to vertical position and Fig. 25 being a side elevation thereof.

Figure 26:
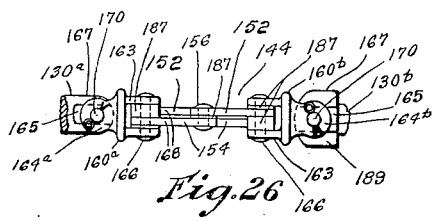
Figure 27:
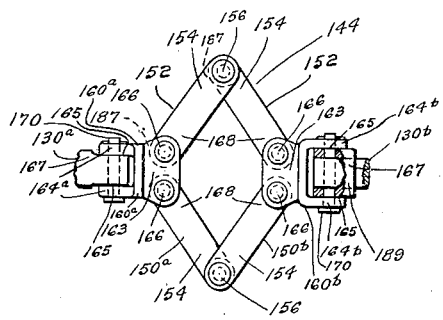

Figs. 26 and 27 show a further modified form of this connecting means similar to the embodiment shown in Figs. 18 and 19 with the exception that the inner ends of the links are not pivotally joined at the same point to the hinge members, Fig. 26 being a plan view thereof when moved to vertical position and Fig. 27 being a side elevation thereof.

Figure 28:
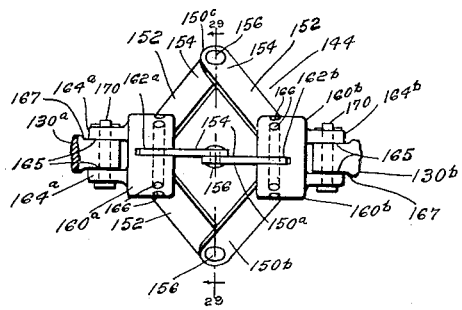
Figure 29:
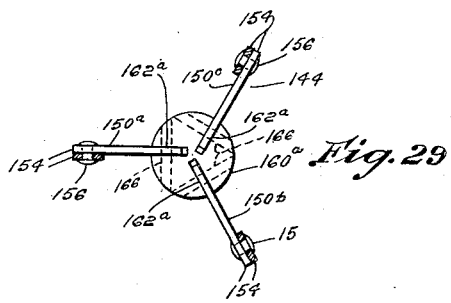

Figs. 28 and 29 show another modified form of my invention similar in construction to an engine governor and comprising a plurality of sets of toggle joints joined to hinge members pivotally attached to adjacent ends of the rod sections to pivot in one plane, Fig. 28 being a side elevation thereof and Fig. 29 a sectional view thereof along the line 29—29 of Fig. 28.

Figure 30:
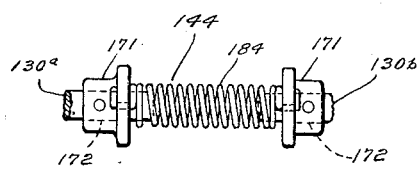

Fig. 30 is a side elevation of a further modified means for connecting the rod sections of the rotatable controlling means, said means comprising an expansible, flexible, yet rotatable spring.

In the drawings, wherein like characters of reference indicate like parts throughout, 36 generally indicates the frame of an automobile, 38 the rear axle thereof and 40 the front axle thereof, the frame 36 being resiliently mounted as usual by means of the springs 42 on said axles. The rear wheels 44 are mounted on the ends of the rear axle 38 and the front wheels 46 are mounted on the ends of said front axle 40 so as to rotate freely about a substantially horizontal axis, the rear wheels 44 having the usual braking mechanisms 48 which braking mechanisms are generally similar in construction to the braking mechanisms I am about to describe for the front wheels. The rear wheels 44 are non-swivably mounted as usual on the ends of the rear axle 38. The front wheels 46 are mounted in the usual manner to swivel around a substantially vertical axis on the ends of the front axle 40. For this purpose the front axle 40 is provided at each end thereof with the vertical spindle yoke 50, having the usual vertical holes 52 in the ends thereof to receive the vertical spindle 54. Each axle spindle 56 is provided with the usual integral vertical spindle body casing 58 at the inner end thereof. Said casing is adapted to be contained between the ends of the vertical spindle yoke 50, the usual vertical spindle 54 being inserted through the vertical holes 52 in the ends of the spindle yoke 50 and the vertical spindle body casing 58 and thereby secured to said yoke by the usual vertical spindle nut 60. It is obvious that the axle spindle 56 and integral spindle body casing 58 are adapted to swivel on the vertical spindle 54. The usual steering rods 62 are attached as usual to the holes 64 in the sides of the spindle body casings.

I have provided a front wheel braking mechanism similar in general construction to the rear wheel braking mechanism, the front wheel braking mechanism 66 being of the expansion type commonly employed on Fords and most other types of automobiles. I provide a hub or axle casing 70 having the usual means 72 for attachment of the usual hub cap 74 on the outer end thereof the usual cylinder 71 for attachment of the spoke tenons 76 thereon, the usual inner hub flange 78 provided with the usual cup shaped large ball race 80 on the inner end thereon. To provide said hub with a suitable brake drum I radially extend the inner hub flange 78 as at 82 and I provide the exterior edge thereof with an annular inwardly projecting hub brake drum 84. Or it might be said that I take the usual rear wheel and rear wheel brake hub construction and attach centrally thereof the inwardly projecting cup shaped large ball race 80.

I provide the inner end of the spindle 56 adjacent to the vertical spindle casing 58 and substantially radially above the usual ball retainer 86, in my preferred embodiment shown in Fig. 12 with a radially spread out brake flange 88 extended to a diameter slightly less than that of the cooperating hub brake drum 84. In the preferred embodiment shown in Fig. 12 this brake flange 88 is preferably cast integral within the axle spindle 56 and vertical spindle body casing 58.

In the embodiment shown in Figs. 13–16, I provide a brake flange 88 which may be detachably secured to the spindle body casing 58 to swivel therewith to attach my invention to already built cars. For this purpose I provide the bracket 90 having the vertical channel 92 therein adapted to enclose the spindle body casing 58 and thereby be detachably secured to the brake flange 88 by bolts 94. To insure that the vertical plane of rotation of the wheel and hence plane of the brake flange 88 will be at the desired axis from the spindle casing 58 I insert the piece 96 having the curved semicircular edge 98 adapted to abut the spindle casing 58 and the base 100 adapted to be detachably secured between the brake flange 88 and the bracket 92 by the attaching bolts 94.

The embodiment of the braking means 66 shown in the drawings of a Ford automobile employs a common type of expansion braking means. The brake shoe 102 thereof comprises two semi-circular sections 106 and 108 each being pivoted on the brake shoe supporting bolt 110 and secured thereto by the brake shoe supporting nut 112. The ends of said brake shoe sections 106 and 108 diametrically opposite from the pivot bolt 110 thereof are flattened as at 114. The usual springs 116 attached to lugs 117 on the inner periphery on each brake shoe section 106 and 108 tend to inwardly pivot said sections away from the brake drum flange 84. To outwardly expand said brake shoe sections 106 and 108 against the pressure of the springs 116, I provide the preferably oval shaped cam 118 which may be revolved so that its largest diameter contacts the flattened ends of the shoe sections to expand said sections against the brake drum flange 84 and which may be revolved so that when its smallest diameter contacts the flattened ends 114 of the brake shoe sections 106 and 108, the springs 116 will pivotally contract said sections to withdraw them away from the brake drum flange 84. These cams 118 have been revolved hitherto in many fashions and my invention comprises in combination therewith of means freely flexible and freely expansible to revolve said cams 118 to apply the brakes. The brake flange 88 is provided with a suitable hole 120 for the brake cam actuating rod, a suitable hole 122 for the brake shoe supporting bolt 110 and may also be provided with a suitable hole 124 for suitable attachment thereto of an emergency wheel retaining device, the subject matter of my prior Patent #1,491,-568, issued April 22, 1924.

As explained the cam 118 is usually revolved by some type of means actuated from the driver's seat. To apply the brakes in most types of mechanical front wheel brakes and in my invention the cams 118 are preferably revolved by rods or other rotatable means preferably mounted on the vehicle either on the axle or on the frame on a transverse horizontal axis parallel to that of the front axle. As explained due to the nonflexibility of former brake controlling means in most embodiments the axes of the rotatable rods have been vertically in line with the axis of the front axle. In the preferred embodiment of my invention shown the rotatable rods 130 are preferably mounted on brackets 132 attached to the front axle adjacent to each end thereof. The brackets 132 may be cast integral with the front axle 40 or may comprise detachable members as shown in Fig. 11 having the arms 125 for embracing the front axle having the holes 136 in the sides thereof to receive bolts 138 to secure them thereto and extensions comprising the collars 140 parallel to the front axle 40, in which the rotatable rods 130 may be revolvably mounted. In my preferred embodiment I break this rotatable means into two rod sections 130$^a$ and 130$^b$, the section 130$^a$ being adapted to revolve within the collar 140 and having the arm 142 depending therefrom for a purpose to be described and the section 130$^b$ having the cam 118 attached to the outer end thereof, the cam 118 functioning as explained to actuate the braking mechanism. I connect these rod sections by connecting means which is not only freely axially expansible and freely flexible, but also rotatable to revolve the cams 118 to apply the brakes. Broadly my invention covers the combination of a stationary axle, a wheel mounted on each end of each axle so as to rotate freely around a substantially horizontal axis and swivel around a substantially vertical axis, a braking mechanism attached to each wheel and means operable from the driver's seat to actuate said braking mechanisms, said means including expansion joints to compensate for swiveling of the wheel and to permit relative movement between said axle or frame and wheels and I broadly claim the combination of any suitable means for this purpose as I have shown the first means suitable for this purpose. As explained, my invention is so freely expansible and so freely flexible that it may be mounted on the vehicle and function perfectly even if the rotatable means is not in line vertically with the axle or if the swiveling points thereof are not vertically in line with the vertical spindle.

Figs. 18–30 illustrate various embodiments of my freely expansible connecting means for the separated rod sections 130$^a$ and 130$^b$ of the rotatable means 130. In my specific embodiment this connecting means 144 broadly comprises sets of freely expansible toggle joints joined to adjacent ends of said rod sections and pivotable in a plane at right angles thereto. In the embodiment shown in Figs. 18 and 19 two toggle joints joined together pivotally attached to adjacent ends of the rod sections are employed, said joints being pivotable in one plane only at right angles to the axis of said rod sections. In the embodiment shown in Figs. 20 and 21, said toggle joints are not only pivotable in one plane but are revolvably, universally pivotally mounted on the adjacent ends of the rod sections. The embodiment shown in Figs. 22 and 23 shows a combination of these two embodiments, the toggle joints being pivotally joined to the rod section 130$^a$ to pivot in one plane at right angles thereto but are pivotally joined to the section 130$^b$ to rotatably universally pivot. Figs. 24 and 25 show an embodiment wherein the toggle joints are separated and centrally pivoted in one plane. The embodiment shown in Figs. 26 and 27 is generally similar to the preferred embodiment shown in Figs. 18 and 19. The embodiment shown in Figs. 28 and 29 comprises a plurality of sets of toggle joints instead of two as in my preferred embodiment. Fig. 30 shows an embodiment of my invention comprising a freely flexible expansible yet rotatable spring means for this purpose. My invention functions axially satisfactorily if only two sets of toggle joints are employed. The ends of these may be loosely mounted in brackets attached to the ends of the rod sections 130$^a$ and 130$^b$ and the central portions thereof may be joined together to permit pivoting of said joints in a plane at right angles to that of said rod sections 130$^a$ and 130$^b$.

In my preferred embodiment, two sets of flat links 152 are employed to make up each toggle joint 150$^a$ and 150$^b$ preferably having the outer ends 154 pivotally joined together in one plane by the connecting pins 156. I employ the word "outer" to refer to the axial centre of the rotatable means 130 and center of the connecting means. The inner ends of said respective joints 150$^a$ and 150$^b$ or individual links 152 are preferably pivotally mounted in the same plane on hinges 160$^a$ and 160$^b$ pivotally mounted on the adjacent rod sections 130$^a$ and 130$^b$ to pivot in a plane at right angles to said rod sections. It is obvious that the toggle joints 150$^a$ and 150$^b$ in the embodiments shown in Figs. 18–23 and 26 and 27 form a connection for said rod sections of varying parallelogram shape freely expansible axially thereof. In Figs. 20–23 as explained I have pivotally mounted said hinge members 160ᵃ and 160ᵇ so that they may rotatably universally pivot on the adjacent ends 130ᵃ and 130ᵇ of said rod sections.

Specifically the construction of the preferred embodiment of my connecting means shown in Figs. 18 and 19 is as follows: The two sets of toggle joints 150ᵃ and 150ᵇ each comprise two flat links 152, the outer ends 154 of said flat links 152 also being the outer ends 154 of said toggle joints 150ᵃ and 150ᵇ having their flat sides joined together to pivot in one plane by the connecting pins 156. As stated I provide hinge members, means to pivotally secure the inner ends of said links to said hinge members in the plane of the toggle joints and means to secure the adjacent ends of said rod sections to said hinge members in a plane at right angles to said rod sections. In my preferred embodiment the hinge members 160ᵃ and 160ᵇ are provided with the socket ears 162ᵃ and 162ᵇ adjacent to said toggle joints and a second set of socket ears 164ᵃ and 164ᵇ at the opposite ends thereof. The pins 166 are provided to pivotally secure the inner ends 168 of said links, the inner ends of said links being the inner ends of said toggle joints 150ᵃ and 150ᵇ, between the ears 162ᵃ and 162ᵇ of said hinge members 160ᵃ and 160ᵇ in the plane of said toggle joints, said links and toggle joints thus forming a flat expansible parallelogram. The adjacent ends of the rod sections 130ᵃ and 130ᵇ are provided with extensions 167 having flattened portions 165 on diametrically opposite sides thereof. I provide the pins 170 to pivotally secure the flattened portions 165 of said extensions 167 of said rod sections 130ᵃ and 130ᵇ within said second set of socket ears 164ᵃ and 164ᵇ of said hinge members so that said hinge members may pivot in a plane at right angles to said rod sections and in my preferred embodiment also at right angles to the plane of pivoting of the inner ends of said toggle joints 150ᵃ and 150ᵇ on said hinge members 160ᵃ and 160ᵇ. As stated my preferred embodiment provides connecting means which will lock the brakes and permit turning of the wheels but will not release the brakes on turning of the wheels.

The embodiments of my invention shown in Figs. 20–23 are so freely flexible that they will release the brakes on turning of the wheels. To provide means to universally rotatably pivot the toggle joints 150ᵃ and 150ᵇ on the adjacent ends 130ᵃ and 130ᵇ of said rod sections, I construct the extensions 167 of said rod sections as follows: I provide the connecting members 171 having holes 172 in the ends thereof adjacent to the ends of said rod sections 130ᵃ and 130ᵇ to receive the ends of said sections 130ᵃ and 130ᵇ therein for attachment thereto and the socket ears 174 on the opposite ends thereof.

I provide as part of said extensions 167 the cylindrical journal members 176, said journal members comprising two cylinders joined at right angles to each other. The inner cylinders 169 of said journal members 176 of the extensions 167 of said rod sections 130ᵃ and 130ᵇ are secured by the pins 170 within the second set of socket ears 164ᵃ and 164ᵇ on said hinge members 160ᵃ and 160ᵇ, the flattened ends 165 thereof abutting said ears. I connect the outer cylinders 175 of the cylindrical journal members 176 to the connecting socket members 171 of the extensions 167 by the pins 178 which project through holes in said ears and through the hollow outer cylinders 175 of said journal members, the flattened ends 180 of said cylindrical journal members abutting said ears 174. It is obvious that this construction thus provides means to universally rotatably mount said hinge members 160ᵃ and 160ᵇ on the adjacent ends 130ᵃ and 130ᵇ of said rod sections.

Figs. 22–23 show a connecting means comprising the toggle joints 150ᵃ and 150ᵇ connected together in parallelogram shape as explained for the previous embodiments but wherein the inner hinge member 160ᵃ is pivoted in one plane only on the end 130ᵃ of said rod section as hitherto described, whereas the outer hinge member 160ᵇ is rotatably universally mounted on the adjacent end of the rod section 130ᵇ in the manner identical to that of my prior embodiment shown in Figs. 20 and 21. This embodiment also functions so freely as to release the front wheel brakes on swiveling thereof.

The embodiment shown in Figs. 24 and 25 comprises two sets of toggle joints, each having one end thereof pivotally joined to adjacent rod sections in one plane and having the opposite ends thereof pivotally joined together, in the same plane, said joints being also pivotable in a plane at right angles to said rod sections. The connecting members 171 are provided with the usual sockets 172 for receiving the adjacent ends of the rod sections 130ᵃ and 130ᵇ therein for attachment thereto, the opposite ends 174 thereof being provided with diametrically opposite extensions, said extensions being provided with run-ways 180 lengthwise thereof on each radial extension 182 thereof. I provide the pins 156 to slidably mount the outer ends 154 of said toggle joints 150ᵃ and 150ᵇ in said run-ways 180 to permit expansion and contraction of said toggle joints 150ᵃ and 150ᵇ as usual. The inner ends 168 of said links 152 and toggle joints 150ᵃ and 150ᵇ are pivotally mounted in the same plane as the expansible plane of said joints just described by the pins 166 on the hinge members 160ᵃ and 160ᵇ. Said hinge members 160ᵃ and 160ᵇ are joined together in any suitable fashion to pivot in a plane at right angles to said rod sections 130ª and 130ᵇ preferably by the pin 183 which projects through holes in the ears 184 of the hinge member 160ᵇ and the flat projection 186 of the hinge member 160ª. It is obvious that this connecting means will permit free expansion of said toggle joint 150ª and 150ᵇ and pivoting of said connecting means in a plane in right angles to the plane of the rod sections as in my preferred embodiment.

The embodiment shown in Figs. 26 and 27 is identical in construction to my preferred embodiment of Figs. 18 and 19 with the exception that the inner ends 168 of said toggle joints 150ª and 150ᵇ instead of being adjacently pivotally mounted between the ears 162ª and 162ᵇ of the hinge members 160ª and 160ᵇ are separately pivotally mounted by the pins 166 on the flat extensions 163 of said hinge members 160ª and 160ᵇ. The links may be provided with the washers 187 as shown in Figs. 22 and 26 to ease the friction if desired. The inner end of the outer rod section 130ᵇ may be provided with the collar 189 if desired to abut the inner edge of the brake flange 88 to keep said connecting means in adjustment.

The embodiment shown in Figs. 28 and 29 is similar to the preferred embodiment shown in Figs. 18 and 19 with the exception that a plurality of toggle joints 150ª and 150ᵇ and 150ᶜ are employed instead of two toggle joints, joined preferably together and to the hinge members in spherical shape. The outer ends 154 of said links are joined together as usual by the pins 156 and the inner ends thereof are pivotally mounted as usual on the pins 166 in the three sets of slots 162ª and 162ᵇ radially disposed on said hinge members 160ª and 160ᵇ, the hinge members being provided as usual with the ears 164ª and 164ᵇ. The ears 164ª and 164ᵇ contain the flattened sides 165 of the extensions 167 of said adjacent rod sections 130ª and 130ᵇ and are pivotally secured thereon by the usual pins 170.

As stated my invention broadly covers a connection axially expansible, flexible and yet rotatable. Fig. 30 shows an embodiment of spring means which may be employed for this purpose. The rod sections 130ª and 130ᵇ are provided with the usual connecting socket members 171 having the usual sockets 172 to receive the adjacent ends of the rod sections 130ª and 130ᵇ therein. A helical spring 184 is suitably mounted between said socket members 170.

It is obvious that I have provided various embodiments of means freely axially expansible, flexible and yet rotatable which are not only an invention in themselves but which in combination with the elements of a front wheel provide a new combination which renders mechanical controlling means for front wheel brakes practical for the first time, no matter where attached to the vehicle.

The rotatable means 130 are as explained revolvably mounted in the collars 140 projecting from the front axle 40. To rotate said rotatable means 130 to apply the braking mechanisms some type of means operable from the driver's seat is necessary. Automobiles are normally provided with controller shafts 200 adapted to be rotated usually by the hand lever 202 to move the rods 204ª and 204ᵇ longitudinally to move the rotatable means 130 to apply the brakes. Any suitable type of means operable from the driver's seat to rotate the controller shaft 200 such as a foot pedal, etc. in place of hand lever 202 may be employed and I preferably employ a hand lever and foot pedal adapted to independently or cumulatively rotate the controller shaft such as is shown in my Patent, 1,575,323, filed on even date herewith. In the embodiment shown, I have provided a construction which on rotation of the controller shaft 200 will operate the rotatable rods 130 on both front and rear axles with a pulling motion to apply the brakes. To this end I mount preferably adjacent to the ends of the controller shaft, the levers of the first class 206 each having arms 208 and 210 radially projecting therefrom preferably at diametrically opposite points thereof and having the holes 212 centrally thereof to secure said levers 206 to said controller shaft 200. Said levers are arranged preferably with the arms 210 depending therefrom and the arms 208 projecting upwardly therefrom. As stated I provide the rods 204ª and 204ᵇ for revolving the rotatable brake actuating means 130 of the front and rear brakes respectively. The rods 204ª are pivotally attached to the depending arms 210 of said levers 206 and have the opposite ends thereof pivotally attached to the arms 142 projecting from said rotatable rods 130 of the front wheels. The rods 204ᵇ are pivotally connected to the upwardly projecting arms 208 of the levers 206 and are pivotally connected to the arms 142 mounted on the rotatable rods 130 for actuating the rear wheel brakes. I preferably provide turnbuckles or other means to longitudinally adjust the rods 204 for a purpose to be described. To this end I provide the turnbuckles 216 having holes adapted to receive the pins 220 for detachably securing said turnbuckles 216 to the ends of the downwardly projecting arms 210. The upwardly projecting arms 208 are provided with similar turnbuckles 216 detachably pivotally secured thereto. The turnbuckles 216 are provided with the threaded sockets 221 adapted to receive the ends of the rods 204 therein. Turnbuckles 216 may also be provided at the opposite ends of said oscillatable rods 201 to connect them to the rotatable means 130 if desired. It is obvious that by the means of the levers of the first class 206 attached to the controller shaft 200 I have provided means whereby both brake actuating means may be rotated with a pulling motion insuring a firmer application of the brakes than where one is operated with a pushing motion. By means of the turnbuckles 216 I have also provided means whereby the rods 204ª and 204ᵇ may be relatively adjusted to apply the rear wheel brakes first and whereby each individual rod 204 may be separately adjusted if desired to compensate for varying amounts of wear on said individual braking means 66.

I employ the word "rod" or "rod sections" to include any members that may be rotated flexible or otherwise.

It is understood that my invention is not limited to the specific embodiments shown and that various deviations may be made therefrom without departing from the spirit and scope of the appended claims.

What I claim as new and desire to secure as Letters Patent is:

1. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said vehicle, said rotatable means comprising rod sections and connecting means therefor comprising sets of freely expansible toggle joints joined to adjacent ends of said rod sections and pivotable in a plane at right angles thereto, and means operable from the driver's seat to rotate said means to actuate said braking mechanisms.

2. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said axle parallel therewith and on a different axis therefrom, said rotatable means comprising rod sections and connecting means therefor comprising sets of freely expansible toggle joints joined to adjacent ends of said rod sections and pivotable in a plane at right angles thereto, and means operable from the driver's seat to rotate said means to actuate said braking mechanisms.

3. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said vehicle, said rotatable means comprising rod sections and connecting means therefor comprising two sets of toggle joints each having one end thereof pivotally joined to adjacent ends of said rod sections in one plane and having the opposite ends thereof pivotally joined together in the same plane, said joints being also pivotable in a plane at right angles to said rod sections, and means operable from the driver's seat to rotate said means to actuate said braking mechanisms.

4. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said axle parallel therewith and on a different axis therefrom, said rotatable means comprising rod sections and connecting means therefor comprising two sets of toggle joints each having one end thereof pivotally joined to adjacent ends of said rod sections in one plane and having the opposite ends thereof pivotally joined together in the same plane, said joints being also pivotable in a plane at right angles with said rod sections, and means operable from the driver's seat to rotate said means to actuate said braking mechanisms.

5. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said vehicle, said rotatable means comprising rod sections and connecting means therefor comprising two sets of toggle joints each comprising two flat links having the outer ends thereof pivotally joined together in one plane and the inner ends thereof pivotally mounted in the same plane on hinges pivotally mounted on adjacent ends of said rod sections in a plane at right angles thereto, said toggle joints forming a connection of varying parallelogram shape freely expansible axially of said rod sections, and means operable from the driver's seat to rotate said means to actuate said braking mechanisms.

6. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said axle parallel therewith and on a different axis therefrom, said rotatable means comprising rod sections and connecting means therefor comprising two sets of toggle joints each comprising two flat links having the outer ends thereof pivotally joined together in one plane, and the inner ends thereof pivotally mounted in the same plane on hinges pivotally mounted on adjacent ends of said rod sections in a plane at right angles thereto, said toggle joints forming a connection of varying parallelogram shape freely expansible axially of said rod sections, and means operable from the driver's seat to rotate said means to actuate said braking mechanisms.

7. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said vehicle, said rotatable means comprising rod sections and two sets of toggle joints each comprising two flat links having the outer ends thereof pivotally joined together in one plane and the inner ends thereof pivotally mounted in the same plane on hinge means universally rotatably mounted on adjacent ends of said rod sections, said toggle joints forming a connection of varying parallelogram shape freely expansible axially of said rod sections, and means operable from the driver's seat to rotate said means to actuate said braking mechanisms.

8. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said axle parallel therewith and on a different axis therefrom, said rotatable means comprising rod sections and connecting means therefor comprising two sets of toggle joints each comprising two flat links having the outer ends thereof pivotally joined together in one plane and the inner ends thereof pivotally mounted in the same plane on hinge means universally rotatably mounted on adjacent ends of said rod sections, said toggle joints forming a connection of varying parallelogram shape freely expansible axially of said rod sections, and means operable from the driver's seat to rotate said means to actuate said braking mechanisms.

9. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said vehicle, said rotatable means comprising rod sections and connecting means for said rod sections comprising two sets of toggle joints each comprising two flat links having the outer ends thereof pivotally joined together in one plane and the inner ends thereof pivotally mounted on hinges in the same plane, said hinges being pivotally mounted on adjacent ends of said rod sections in a plane at right angles thereto, and means operable from the driver's seat to rotate said means to actuate said braking mechanisms.

10. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said axle parallel therewith and on a different axis therefrom, said rotatable means comprising rod sections and connecting means for said rod sections comprising two sets of toggle joints each comprising two flat links having the outer ends thereof pivotally joined together in one plane and the inner ends thereof pivotally mounted on hinges in the same plane, said hinges being pivotally mounted on adjacent ends of said rod sections in a plane at right angles thereto, and means operable from the driver's seat to rotate said means to actuate said braking mechanisms.

11. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said vehicle, said rotatable means comprising rod sections and connecting means for said rod sections comprising two sets of toggle joints each comprising two flat links, pins to pivotally join the outer ends of each together in one plane, hinge members having a set of socket ears at one end thereof and a second set of socket ears at the opposite end thereof, pins to pivotally secure the inner ends of said links within said first set of socket ears in the plane of said toggle joints, cylindrical journal members comprising two cylinders joined at right angles to each other, pins to pivotally secure the inner cylinders thereof within said second set of socket ears on said hinge members, connecting members having holes to receive adjacent ends of said rod sections therein for attachment thereto and ears at the opposite end thereof and pins to pivotally secure the outer cylinders of said cylindrical journal members to said connecting members, the flattened ends of said cylindrical journal members abutting said ears and means operable from the driver's seat to rotate said means to actuate said braking mechanisms.

12. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said axle parallel therewith and on a different axis therefrom, said rotatable means comprising rod sections and connecting means for said rod sections comprising two sets of toggle joints each comprising two flat links, pins to pivotally join the outer ends of each together in one plane, hinge members each having a set of socket ears at one end thereof and a second set of socket ears at the opposite end thereof, pins to pivotally secure the inner ends of said links within said first set of socket ears in the plane of said toggle joints, cylindrical journal members comprising two cylinders joined at right angles to each other, pins to pivotally secure the inner cylinders thereof within said second set of socket ears on said hinge members, connecting members having holes to receive adjacent ends of said rod sections therein for attachment thereto and ears at the opposite end thereof and pins to pivotally secure said cylindrical journal members to said connecting members, the flattened ends of said cylindrical journal members abutting said ears, and means operable from the driver's seat to rotate said means to actuate said braking mechanisms.

13. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said vehicle, said rotatable means comprising rod sections and connecting means for said rod section comprising two sets of toggle joints, each comprising two flat links, means to pivotally secure the outer ends of said links together in one plane, hinge members, means to pivotally secure the inner ends of said links to said hinge members in the plane of the toggle joints, journal members, means to pivotally secure said journal members to said hinge members in a plane at right angles to the plane of the toggle joints and means to pivotally secure adjacent ends of said rod sections to said journal members in a plane at right angles to the pivoting plane of said journal members on said hinge members and in a plane at right angles to said rod sections, and means operable from the driver's seat to rotate said means to actuate said braking mechanisms.

14. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said axle parallel therewith and on a different axis therefrom, said rotatable means comprising rod sections and connecting means for said rod sections comprising two sets of toggle joints each comprising two flat links, means to pivotally secure the outer ends of said links together in one plane, hinge members, means to pivotally secure the inner ends of said links to said hinge members in the plane of the toggle joints, journal members, means to pivotally secure said journal members to said hinge members in a plane at right angles to the plane of the toggle joints and means to pivotally secure the adjacent ends of said rod sections to said journal members in a plane at right angles to the pivoting plane of said journal members on said hinge members and in a plane at right angles to said rod sections, and means operable from the driver's seat to rotate said means to actuate said braking mechanisms.

15. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said vehicle, said rotatable means comprising rod sections having extensions having flattened portions on opposite sides thereof and connecting means for said rod sections comprising two sets of toggle joints each comprising two flat links, pins to join the outer ends of said links together in one plane, hinge members each having one set of socket ears at one end thereof and a second set of socket ears at the opposite end thereof, pins to pivotally secure the inner ends of said links within said first set of socket ears in the plane of said toggle joints and pins to secure the flattened portions of said extensions of said rod sections within the second set of socket ears, and means operable from the driver's seat to rotate said means to actuate said braking mechanisms.

16. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said axle parallel therewith and on a different axis therefrom, said rotatable means comprising rod sections having extensions having flattened portions on opposite sides thereof and connecting means for said rod sections comprising two sets of toggle joints, each comprising two flat links, pins to join the outer ends of said links together in one plane, hinge members each having a set of socket ears at one end thereof and a second set of socket ears at the opposite ends thereof, pins to pivotally secure the inner ends of said links within said first set of socket ears in the plane of said toggle joints and pins to secure the flattened portions of said extensions of said rod sections within the second set of socket ears, and means operable from the driver's seat to rotate said means to actuate said braking mechanisms.

17. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said vehicle, said rotatable means comprising rod sections and connecting means for said rod sections comprising two sets of toggle joints each comprising two flat links, means to pivotally secure the outer ends of said flat links together in one plane, hinge members, means to pivotally secure the inner ends of said links to said hinge members in the plane of the toggle joints and means to pivotally secure adjacent ends of said rod sections to said hinge members in a plane at right angles to said rod sections and means operable from the driver's seat to rotate said means to actuate said braking mechanisms.

18. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said axle parallel therewith and on a different axis therefrom, said rotatable means comprising rod sections and connecting means for said rod sections comprising two sets of toggle joints each comprising two flat links, means to pivotally secure the outer ends of said flat links together in one plane, connecting hinge members, means to pivotally secure the inner ends of said links to said hinge members in the plane of the toggle joints and means to pivotally secure adjacent ends of said rod sections to said hinge members in a plane at right angles to said rod sections, and means operable from the driver's seat to rotate said means to actuate said braking mechanisms.

19. Rotatable means freely expansible and freely flexible in all directions comprising rod section and connecting means therefor comprising sets of freely expansible toggle joints joined to adjacent ends of said rod sections and pivotable in a plane at right angles thereto.

20. Rotatable means freely expansible and freely flexible in all directions comprising rod sections and connecting means therefor comprising two sets of toggle joints each having one end thereof pivotally joined to adjacent ends of rod sections in one plane and having the opposite ends thereof pivotally joined together in the same plane, said joints being also pivotable in a plane at right angles to said rod sections.

21. Rotatable means freely expansible and freely flexible in all directions comprising rod sections and connecting means therefor comprising two sets of toggle joints each comprising two flat links having the outer ends thereof pivotally joined together in one plane and the inner ends thereof pivotally mounted in the same plane on hinges pivotally mounted on adjacent ends of said rod sections in a plane at right angles thereto, said toggle joints forming a connection of varying parallelogram shape freely expansible axially of said rod sections.

22. Rotatable means freely expansible and freely flexible in all directions comprising rod sections and two sets of toggle joints each comprising two flat links having the outer ends thereof pivotally joined together in one plane and the inner ends thereof pivotally mounted in the same plane on hinge means universally rotatably mounted on adjacent ends of said rod sections, said toggle joints forming a connection of varying parallelogram shape freely expansible axially of said rod sections.

23. Rotatable means freely expansible and freely flexible in all directions comprising rod sections and connecting means for said rod sections comprising two sets of toggle joints each comprising two flat links having the outer ends thereof pivotally joined together in one plane and the inner ends thereof pivotally mounted on hinges in the same plane, said hinges being pivotally mounted on adjacent ends of said rod sections in a plane at right angles thereto.

24. Rotatable means freely expansible and freely flexible in all directions comprising rod sections and connecting means for said rod sections comprising two sets of toggle joints each comprising two flat links, pins to pivotally join the outer ends of each together in one plane, hinge members each having a set of socket ears at one end thereof and a second set of socket ears at the opposite end thereof, pins to pivotally secure the inner ends of said links within said first set of socket ears in the plane of said toggle joints, cylindrical journal members comprising two cylinders joined at right angles to each other, pins to pivotally secure the inner cylinders thereof within said second set of socket ears on said hinge members, connecting members having holes to receive adjacent ends of said rod sections therein for attachment thereto and ears at the opposite end thereof and pins to pivotally secure the outer cylinders of said cylidrical journal members to said connecting members the flattened ends of said cylindrical journal members abutting said ears.

25. Rotatable means freely expansible and freely flexible in all directions comprising rod sections and connecting means for said rod sections comprising two sets of toggle joints each comprising two flat links, means to pivotally secure the outer ends of said links together in one plane, hinge members, means to pivotally secure the inner ends of said links to said hinge members in the plane of the toggle joints, journal members, means to pivotally secure said journal members to said hinge members in a plane at right angles to the plane of the toggle joints and means to pivotally secure the adjacent ends of said rod sections to said journal members in a plane at right angles to said rod sections.

26. Rotatable means freely expansible and freely flexible in all directions comprising rod sections having extensions having flattened portions on opposite sides thereof and connecting means for said rod sections comprising two sets of toggle joints each comprising two flat links, pins to join the outer ends of said links together in one plane, hinge members each having one set of socket ears at one end thereof and a second set of socket ears at the opposite end thereof, pins to pivotally secure the inner ends of said links within said first set of socket ears in the plane of said toggle joints and pins to secure the flattened portions of said extensions of said rod sections within the second set of socket ears.

27. Rotatable means freely expansible and freely flexible in all directions comprising rod sections and connecting means for said rod sections comprising two sets of toggle joints each comprising two flat links, means to pivotally secure the outer ends of said flat links together in one plane, connecting hinge members, means to pivotally secure the inner ends of said links to said hinge members in the plane of the toggle joints and means to pivotally secure adjacent ends of said rod sections to said hinge members in a plane at right angles to said rod sections.

28. In a road vehicle, the combination of a rear axle, a front axle, wheels mounted on each end of said front axle so as to rotate freely around a substantially horizontal axis and to swivel around a substantially vertical axis and wheels mounted on each end of said rear axle so as to rotate freely around a substantially horizontal axis, braking mechanisms for each wheel, rotatable rods one for each braking mechanism mounted substantially parallel with said axles having arms projecting radially therefrom, a brake controller shaft, means operable from the driver's seat to rotate said brake controller shaft, levers of the first class having holes substantially centrally thereof for mounting thereof on said controller shaft to have one set of arms depending downwardly therefrom and an opposite set of arms projecting upwardly therefrom, oscillatable rods for rotating said rotatable rods pivotally joined to the ends of said arms and the arms on said rotatable rods whereby rotation of said controller shaft may operate with a pulling motion to rotate the rotatable rods of the front and rear wheels to apply the braking mechanisms and turnbuckles on said oscillatable connecting rods whereby said rods may be connected to apply the rear wheel brakes before the front wheel brakes and to compensate for varying amounts of wear on the braking mechanisms.

29. In a road vehicle, the combination of a rear axle, a front axle, wheels mounted on each end of said front axle so as to rotate freely around a substantially horizontal axis and to swivel around a substantially vertical axis and wheels mounted on each end of said rear axle so as to rotate freely around a substantially horizontal axis, braking mechanisms for each wheel, rotatable rods one for each braking mechanism mounted substantially parallel with said axles having arms projecting radially therefrom, a brake controller shaft, means operable from the driver's seat to rotate said brake controller shaft, levers of the first class having holes substantially centrally thereof for mounting thereof on said controller shaft to have one set of arms depending downwardly therefrom and a diametrically opposite set of arms projecting upwardly therefrom, longitudinally oscillatable connecting rods, hinge means having threaded sockets for adjustable attachment thereto of said connecting rods, means for pivotally detachably attaching the ends of said lever arms to said hinge means and means for pivotally connecting said oscillatable rods to the arms of said rotatable rods.

30. In a road vehicle, the combination of a stationary axle, a wheel mounted on each end of said axle so as to rotate freely around a substantially horizontal axis and to swivel around a substantially vertical axis, a braking mechanism attached to each wheel and means operable from the driver's seat to actuate said braking mechanisms, said means including a controller shaft rotatable from the driver's seat, rods mounted adjacent said front wheel parallel with said controller shaft, means connected to said controller shaft and rods for rotating said rods on rotation of said controller shaft, joints connected to said rods expansible axially and pivotable in a plane at right angles to said axis to compensate for swiveling of said wheels without any application of said braking mechanism to its respective wheel and universal joints connecting said joints with said rods and said braking mechanisms to permit relative movement between said axle and wheels.

31. In a road vehicle, the combination of a stationary axle, a wheel mounted on each end of said axle so as to rotate freely around a substantially horizontal axis and to swivel around a substantially vertical axis, a braking mechanism attached to each wheel and means operable from the driver's seat to actuate said braking mechanisms, said means including a controller shaft rotatable from the driver's seat, rods mounted adjacent said front wheel parallel with said controller shaft, means connected to said controller shaft and rods for rotating said rods on rotation of said controller shaft, joints connecting said rods with their respective braking mechanisms expansible axially and pivotable in a plane at right angles to said axis to compensate for swivelling of said wheels without any application of said braking mechanism to its respective wheel and to permit relative movement between said axle and wheels.

32. In a road vehicle, the combination of a stationary axle, a wheel mounted on each end of said axle so as to rotate freely around a substantially horizontal axis and to swivel around a substantially vertical axis, a braking mechanism attached to each wheel and means operable from the driver's seat to actuate said braking mechanisms, said means including a controller shaft rotatable from the driver's seat, rods mounted adjacent said front wheel parallel with said controller shaft, rigid connecting rods connected to said controller shaft and rods for rotating said rods on rotation of said controller shaft, joints connecting said rods with their respective braking mechanisms expansible axially and pivotable in a plane at right angles to said axis to compensate for swivelling of said wheels without any application of said braking mechanism to its respective wheel and to permit relative movement between said axle and wheels.

33. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms mounted on said axle, including rods mounted on said axle for each wheel and parallel with said axle and means operable from the driver's seat to rotate said rods to actuate said braking mechanisms.

34. In a road vehicle, the combination of a stationary axle, a wheel mounted on each end of said axle so as to rotate freely around a horizontal axis and to swivel around a substantially vertical axis, a braking mechanism attached to each wheel, rotatable means freely expansible and freely flexible in all directions for actuating said braking mechanisms including rods mounted on said vehicle substantially parallel with said axle and means operable from the driver's seat to rotate said rods to actuate said braking mechanisms, including a controller shaft rotatable from the driver's seat substantially parallel with said rods and rigid connecting rods connecting said controller shaft with said rods.

35. In a road vehicle, the combination of a stationary axle, a wheel mounted on each end of said axle so as to rotate freely around a horizontal axis and to swivel around a substantially vertical axis, an expansion brake attached to each wheel, rotatable means freely expansible and freely flexible in all directions having cams on the outer end thereof adapted to be rotated to expand said brakes and including rods mounted on said axle on a different axis therefrom and substantially parallel therewith and means operable from the driver's seat to rotate said rods to actuate said brakes.

36. In a road vehicle, the combination of a stationary axle, a wheel mounted on each end of said axle so as to rotate freely around a horizontal axis and to swivel around a substantially vertical axis, an expansion brake attached to each wheel, rotatable means freely expansible and freely flexible in all directions having cams on the outer ends thereof and including rods mounted on said vehicle substantially parallel with said axle adapted to be rotated to expand said brakes and means operable from the driver's seat to rotate said rods to actuate said brakes, including a controller shaft substantially parallel with said rods rotatable from the driver's seat and rigid connecting rods connecting said controller shaft with said rods.

37. In a road vehicle, the combination of a stationary axle, a wheel mounted on each end of said axle so as to rotate freely around a horizontal axis and to swivel around a substantially vertical axis, a breaking mechanism attached to each wheel, an actuating means for each braking mechanism mounted on each wheel to swivel therewith, a rotatable rod for each wheel, non-swivably mounted on said axle against longitudinal movement thereon and parallel therewith, means freely movable axially of the axle and freely flexible in all directions, connected to said rotatable rods, and adapted to actuate said braking mechanism actuating means, and means operable from the driver's seat to rotate said rods to actuate said braking mechanisms.

38. In a road vehicle, the combination of a stationary axle, a wheel mounted on each end of said axle so as to rotate freely around a horizontal axis and to swivel around a substantially vertical axis, a braking mechanism attached to each wheel, an actuating means for each braking mechanism mounted on each wheel to swivel therewith, a rotatable rod for each wheel non-swivably mounted on said axle against longitudinal movement thereon and parallel therewith, means freely movable axially of the axle and freely flexible in all directions connected to said rotatable rods and adapted to actuate said braking mechanism actuating means and means operable from the driver's seat to rotate said rods to actuate said braking mechanisms, including a controller shaft rotatable from the driver's seat substantially parallel with said rods, and rigid connecting rods connecting said controller shaft with said rods.

39. In a road vehicle, the combination of a stationary axle, a wheel mounted on each end of said axle so as to rotate freely around a horizontal axis and to swivel around a substantially vertical axis, a braking mechanism attached to each wheel, an actuating means for each braking mechanism mounted on each wheel to swivel therewith, a rotatable rod for each wheel, non-swivably mounted on said axle against longitudinal movement thereon and parallel therewith, a floating translating connection connected to said rods and adapted to actuate each brake mechanism actuating means freely movable axially of the axle and freely flexible in all directions to permit a swivelling movement between said rods and the braking mechanism actuating means and capable of translating a rotatable movement of the rods into an equal movement of the braking mechanism actuating means to apply said braking mechanisms with substantially equal pressure at any angle of swivelling thereof and to maintain said braking pressures on said wheels during the swivelling thereof, and means operable from the driver's seat to rotate said rods to actuate said braking mechanisms.

40. In a road vehicle, the combination of a stationary axle, a wheel mounted on each end of said axle so as to rotate freely around a horizontal axis and to swivel around a substantially vertical axis, a braking mechanism attached to each wheel, an actuating means for each braking mechanism mounted on each wheel to swivel therewith, a rotatable rod for each wheel, non-swivably mounted on said axle against longitudinal movement thereon and parallel therewith, a floating translating connection connected to said rods and adapted to actuate said brake mechanism actuating means, said translating connections being freely movable axially of the axle and freely flexible in all directions to permit a swivelling movement between said rods and braking mechanism actuating means and capable of translating a rotatable movement of the rods into an equal movement of the braking mechanism actuating means to apply said braking mechanisms with substantially equal pressure at any angle of swivelling thereof and to maintain said braking pressures on said wheels during the swivelling thereof, and means operable from the driver's seat to rotate said rods to actuate said braking mechanisms including a controller shaft rotatable from the driver's seat substantially parallel with said rods and rigid connecting rods connecting said controller shaft with said rods.

41. In a road vehicle, the combination of a rear axle, a front axle, wheels mounted on each end of said front axle so as to rotate freely about a substantially horizontal axis and to swivel around a substantially vertical axis and wheels mounted on each end of said rear axle so as to rotate freely around a substantially horizontal axis, braking mechanisms for each wheel, a controller shaft, adjustable means individually connecting said controller shaft with each of said four respective braking mechanisms operable to actuate each braking mechanism on rotation of said controller shaft with predetermined adjustable pressure at any angle of swivelling thereof and means operable from the driver's seat to rotate said controller shaft.

42. In a road vehicle, the combination of a rear axle, a front axle, wheels mounted on each end of said front axle so as to rotate freely about a substantially horizontal axis and to swivel around a substantially vertical axis and wheels mounted on each end of said rear axle so as to rotate freely around a substantially horizontal axis, braking mechanisms for each wheel, a controller shaft, adjustable means individually connecting said controller shaft with each of said four respective braking mechanisms operable to actuate each braking mechanism on rotation of said controller shaft with predetermined adjustable pressure at any angle of swivelling thereof and to maintain said braking pressure on said wheels during swivelling of said wheels and means operable from the driver's seat to rotate said controller shaft.

In testimony whereof I affix my signature.

JOHN B. DES ROSIERS.